United States Patent
Jiang et al.

(10) Patent No.: US 11,715,293 B2
(45) Date of Patent: Aug. 1, 2023

(54) METHODS FOR IDENTIFYING CHARGING DEVICE, MOBILE ROBOTS AND SYSTEMS FOR IDENTIFYING CHARGING DEVICE

(71) Applicant: Hangzhou Ezviz Software Co., Ltd., Hangzhou (CN)

(72) Inventors: Nicong Jiang, Hangzhou (CN); Jianhua Zhu, Hangzhou (CN); Bingwei Shen, Hangzhou (CN); Bin Guo, Hangzhou (CN); Haiqing Jiang, Hangzhou (CN)

(73) Assignee: Hangzhou Ezviz Software Co., Ltd., Hangzhou (CN)

( * ) Notice: Subject to any disclaimer, the term of this patent is extended or adjusted under 35 U.S.C. 154(b) by 269 days.

(21) Appl. No.: 17/266,164

(22) PCT Filed: Aug. 13, 2019

(86) PCT No.: PCT/CN2019/100429
§ 371 (c)(1),
(2) Date: Feb. 5, 2021

(87) PCT Pub. No.: WO2020/034963
PCT Pub. Date: Feb. 20, 2020

(65) Prior Publication Data
US 2021/0312178 A1 Oct. 7, 2021

(30) Foreign Application Priority Data

Aug. 15, 2018 (CN) .......................... 201810929450.7

(51) Int. Cl.
*G06T 7/00* (2017.01)
*G06V 20/10* (2022.01)
(Continued)

(52) U.S. Cl.
CPC .............. *G06V 20/10* (2022.01); *G06F 18/22* (2023.01); *G06F 18/251* (2023.01); *G06T 5/009* (2013.01);
(Continued)

(58) Field of Classification Search
CPC .. G05D 1/0234; G05D 1/0246; G05D 1/0242; G05D 1/0225; G06T 2207/10028;
(Continued)

(56) References Cited

U.S. PATENT DOCUMENTS

| 2012/0323365 | A1 | 12/2012 | Taylor et al. |
| 2014/0100693 | A1 | 4/2014 | Fong et al. |

(Continued)

FOREIGN PATENT DOCUMENTS

| CN | 1768683 | 5/2006 |
| CN | 104036226 | 9/2014 |

(Continued)

OTHER PUBLICATIONS

R. C. Luo, C. T. Liao and S. C. Lin, "Multi-sensor fusion for reduced uncertainty in autonomous mobile robot docking and recharging," 2009 IEEE/RSJ International Conference on Intelligent Robots and Systems, St. Louis, MO, USA, 2009, pp. 2203-2208 , doi: 10.1109/IROS.2009.5354445.*

(Continued)

*Primary Examiner* — Li Liu
(74) *Attorney, Agent, or Firm* — Fish & Richardson P.C.

(57) ABSTRACT

Methods, devices, and systems for identifying charging devices are provided. In one aspect, a method of identifying a charging device include: capturing an infrared image and a depth image of a current field of view with a depth camera; determining, according to the infrared image, that there are one or more suspected charging device areas that satisfy first specified conditions; determining, according to the depth (Continued)

image, that there is a target charging device area whose height relative to a depth camera is within a specified range in the one or more suspected charging device areas; and identifying the charging device according to the target charging device area. The first specified conditions indicate that a gray-scale value of each of pixels in an area is greater than a second specified value, and a number of the pixels in the area is greater than a third specified value.

20 Claims, 5 Drawing Sheets

(51) Int. Cl.
| | | |
|---|---|---|
| G06T 7/80 | (2017.01) | |
| G06T 5/00 | (2006.01) | |
| G06T 5/50 | (2006.01) | |
| G06T 7/60 | (2017.01) | |
| H02J 7/00 | (2006.01) | |
| G06V 20/20 | (2022.01) | |
| G06F 18/22 | (2023.01) | |
| G06F 18/25 | (2023.01) | |
| G06V 10/22 | (2022.01) | |

(52) U.S. Cl.
CPC .................. *G06T 5/50* (2013.01); *G06T 7/60* (2013.01); *G06T 7/80* (2017.01); *G06V 10/225* (2022.01); *G06V 20/20* (2022.01); *H02J 7/0047* (2013.01); *G06T 2207/10024* (2013.01); *G06T 2207/10028* (2013.01); *G06T 2207/10048* (2013.01); *G06T 2207/20208* (2013.01); *G06T 2207/20221* (2013.01); *G06T 2207/30204* (2013.01)

(58) Field of Classification Search
CPC . G06T 2207/10048; G06T 2207/20221; G06T 2207/30204; G06T 7/55; G06V 10/225; Y10S 901/01; A47L 9/2873; A47L 2201/022
See application file for complete search history.

(56) References Cited

U.S. PATENT DOCUMENTS

| | | | |
|---|---|---|---|
| 2014/0240464 A1 | 8/2014 | Lee | |
| 2015/0115876 A1 | 4/2015 | Noh et al. | |
| 2016/0167226 A1* | 6/2016 | Schnittman | G05D 1/0088 901/1 |
| 2018/0210448 A1 | 7/2018 | Lee et al. | |
| 2018/0210452 A1* | 7/2018 | Shin | A47L 9/2805 |

FOREIGN PATENT DOCUMENTS

| | | |
|---|---|---|
| CN | 106444777 | 2/2017 |
| CN | 106647747 | 5/2017 |
| CN | 106826815 | 6/2017 |
| CN | 106826821 | 6/2017 |
| CN | 106875444 | 6/2017 |
| CN | 106980320 | 7/2017 |
| CN | 107124014 | 9/2017 |
| CN | 107392962 | 11/2017 |
| CN | 107590836 | 1/2018 |
| CN | 107633528 | 1/2018 |
| CN | 108124142 | 6/2018 |
| CN | 108171212 | 6/2018 |

OTHER PUBLICATIONS

PCT International Search Report in International Appln. No. PCT/CN2019/100429, dated Oct. 30, 2019, 4 pages (With English Translation).
CN Office Action issued in Chinese Appln. No. 201810929450.7, dated Jan. 4, 2022, 22 pages (With English Translation).
Cassinis et al., "Docking and charging system for autonomous mobile robots", Jan. 2005, 6 pages.
Extended European Search Report issued in European Appln. No. 19850252.8, dated Jul. 20, 2021, 13 pages.
Tsai et al., "Autonomous vision-based tethered-assisted rover docking", 2013 IEEE/RSJ International Conference on Intelligent Robots and Systems(ROS), Nov. 3-7, 2013, Tokyo, Japan, 8 pages.
PCT Written Opinion in International Appln. No. PCT/CN2019/100429, dated Oct. 30, 2019, 10 pages (With English Translation).

* cited by examiner

METHODS FOR IDENTIFYING CHARGING DEVICE, MOBILE ROBOTS AND SYSTEMS FOR IDENTIFYING CHARGING DEVICE

CROSS REFERENCE TO RELATED APPLICATIONS

This application is a National Stage application under 35 U.S.C. §371 of International Application No. PCT/CN2019/100429, having an International Filing Date of Aug. 13, 2019, which claims priority to Chinese patent application No. 201810929450.7 entitled "methods for identifying charging device, mobile robots and systems for identifying charging device" and filed on Aug. 15, 2018, the entire contents of which are incorporated herein by reference.

TECHNICAL FIELD

The present application relates to the field of mobile robots, and in particular, to a method of identifying a charging device, a mobile robot and a system for identifying a charging device.

BACKGROUND

As the application of mobile robots becomes more and more wide, users have higher and higher demands for properties such as long-term duty and extended autonomous time of the mobile robots. Therefore, how to supplement power source of the mobile robots has become a current hotspot. At present, the mobile robots are autonomously charged through an automatic contact charging technology to supplement the power source.

In order to realize autonomous charging, a mobile robot needs to identify a charging device in an environment when its battery level is lower than a preset threshold, and moves from a current location to a location of the charging device to be docked with the charging device for autonomous charging.

SUMMARY

In view of this, the present application provides a method of identifying a charging device, a mobile robot and a system for identifying a charging device.

A first aspect of the present application provides a method of identifying a charging device. A marker is provided on the charging device. A reflectivity of the marker is greater than a first specified value. The method is applied to a mobile robot, and includes:

capturing an infrared image and a depth image of a current field of view with a depth camera;

determining, according to the infrared image, whether there are one or more suspected charging device areas that satisfy first specified conditions, where the first specified conditions indicate that a gray-scale value of each of pixels in an area is greater than a second specified value, and a number of the pixels in the area is greater than a third specified value;

in response of determining there are the one or more suspected charging device areas, determining, according to the depth image, whether there is a target charging device area whose height relative to the depth camera falls within a specified range in the one or more suspected charging device areas; and in response of determining there is the target charging device area in the one or more suspected charging device areas, identifying the charging device according to the target charging device area.

A second aspect of the present application provides a mobile robot, including:

a depth camera configured to capture an infrared image and a depth image of a current field of view; and a processor configured to:

determine, according to the infrared image, whether there is one or more suspected charging device areas that satisfy first specified conditions, where the first specified conditions indicate that a gray-scale value of each of pixels in an area is greater than a second specified value, and a number of the pixels in the area is greater than a third specified value;

in response of determining there are the one or more suspected charging device areas, determine, according to the depth image, whether there is a target charging device area whose height relative to the depth camera falls within a specified range in the one or more suspected charging device areas; and in response of determining there is the target charging device area in the one or more suspected charging device areas, identify a charging device for the mobile robot according to the target charging device area.

A third aspect of the present application provides a system for identifying a charging device, including: a mobile robot provided in the second aspect of the present application, and a charging device configured to charge the mobile robot, where a marker is provided on the charging device, and a reflectivity of the marker is greater than a first specified value.

According to a method of identifying a charging device, a mobile robot and a system for identifying a charging device provided in the present application, a marker with a reflectivity greater than a first specified value is provided on the charging device, and one or more suspected charging device areas are screened preliminarily through an infrared image. Further, according to a depth image, a target charging device area that satisfies geometric information of the charging device is screened from the one or more suspected charging device areas that are screened preliminarily. Finally, the charging device is identified according to the target charging device area. In this way, the one or more suspected charging device areas are verified based on the geometric information of the charging device, and the charging device is identified based on a verified target charging device area, which may effectively improve the accuracy of identification.

DETAILED DESCRIPTION OF THE EMBODIMENTS

Figure 1:
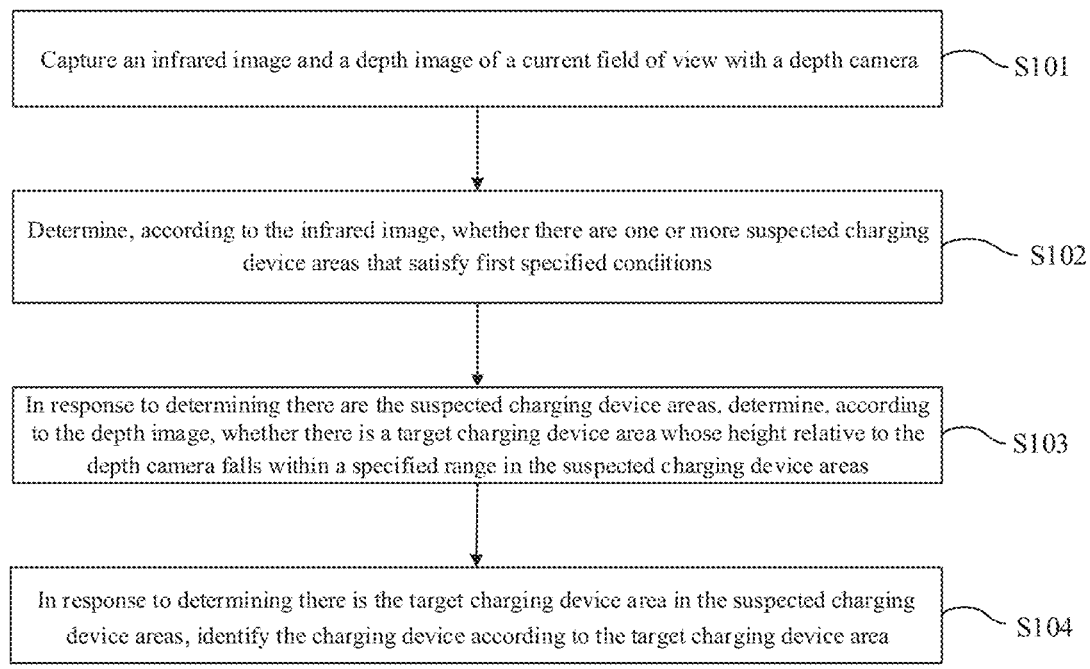
FIG. 1 is a flowchart illustrating a method of identifying a charging device according to a first exemplary embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

At present, a charging device is marked by providing a black and white marker on the charging device, and a RGB camera provided on a robot is used to capture an image to identify the marker from the captured image and complete identification of the charging device. However, when identifying a charging device in the above manner, since the image captured by the RGB camera is easily affected by light intensity and other objects, the accuracy of identifying the charging device through the captured image is low.

This application provides a method of identifying a charging device, a mobile robot and a system for identifying a charging device to solve the problem of low accuracy of the existing identification method.

Several specific embodiments are given below to describe the technical solutions of the application in detail. The specific embodiments may be combined with each other, and same or similar concepts or processes may not be repeated in some embodiments.

FIG. 1 is a flowchart illustrating a method of identifying a charging device according to a first exemplary embodiment of the present application. Referring to FIG. 1, the method provided in this embodiment may include:

At S101, an infrared image and a depth image of a current field of view are captured with a depth camera.

Figure 2:
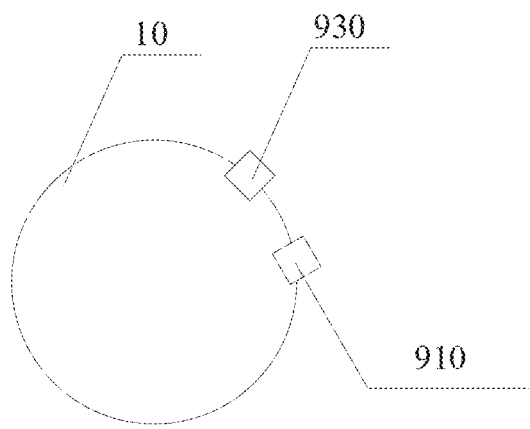
FIG. 2 is a schematic diagram illustrating a mobile robot according to an exemplary embodiment of the present application.

Specifically, FIG. 2 is a schematic diagram illustrating a mobile robot according to an exemplary embodiment of the present application. Referring to FIG. 2, a depth camera 910 is provided on the mobile robot. In an embodiment, the depth camera 910 may be provided on a chassis 10 of the mobile robot. An infrared image and a depth image may be captured with the depth camera. In addition, the depth camera 910 may be a structured light depth camera or a TOF (Time of Flight) depth camera.

Further, the mobile robot, when detecting that a current battery level is lower than a preset threshold, may capture an infrared image and a depth image with the depth camera in order to identify a charging device in an environment through the captured infrared image and depth image. Of course, the mobile robot, when no charging device is identified based on the captured infrared image and depth image, may re-capture an infrared image and a depth image with the depth camera in order to identify a charging device through the re-captured infrared image and depth image. In this embodiment, no limitation is imposed thereon.

It should be noted that the depth camera includes an infrared array sensor with a lens and an infrared light emitter. The depth camera uses the infrared light emitter to illuminate the environment, and then generates an infrared image based on reflected light received by the infrared array sensor. At the same time, the depth camera may obtain distance information between the lens and an object according to the flight time of light to generate the depth image. For the specific structure and working principle of the depth camera, reference may be made to the description in the related art, which will not be repeated here.

At S102, whether there are one or more suspected charging device areas that satisfy first specified conditions is determined according to the infrared image. The first specified conditions indicate that a gray-scale value of each pixel in an area is greater than a second specified value, and a number of pixels in the area is greater than a third specified value.

It should be noted that a marker is provided on the charging device, and a reflectivity of the marker is greater than a first specified value, that is, the marker is made of a highly reflective material. The first specified value may be set according to actual needs, which is not limited in this embodiment. When infrared light is irradiated on the marker, since the reflectivity of the marker is high, most of the infrared light will be reflected by the marker, and a highly bright area appears in the infrared image captured by the depth camera, that is, the gray-scale values of the pixels in the highly bright area are higher.

Further, at step S101, a normal exposure infrared image may be captured. At this time, if there is a charging device in the current field of view, there is necessarily a highly bright area in the normal exposure infrared image. Therefore, in order to detect whether there is a charging device in the current field of view, at step S102, it may be determined whether there are one or more suspected charging device areas that satisfy the first specified conditions in the normal exposure infrared image.

Referring to the previous description, through step S102, the one or more suspected charging device areas may be screened, and the one or more suspected charging device areas are the highly bright areas in the normal exposure infrared image.

It should be noted that the second specified value may be set according to actual needs. In this embodiment, the second specified value is not limited particularly. For example, in an embodiment, the second specified value is 200. Further, the third specified value may also be set according to actual needs. For example, the third specified value may be 100.

Specifically, when it is determined that there is no suspected charging device area that satisfies the first specified conditions, it indicates that there is no charging device in the current field of view. At this time, an infrared image and a depth image may be re-captured with the depth camera to identify a charging device.

At S103, in response to determining there are one or more suspected charging device areas that satisfy the first specified conditions, whether there is a target charging device area whose height relative to the depth camera is within a specified range in the one or more suspected charging device areas is determined according to the depth image.

For example, in an embodiment, it is determined that there are M suspected charging device areas, where M is greater than or equal to 1. At step S103, it is determined whether there is a target charging device area whose height relative to the depth camera is within a specified range in the M suspected charging device areas.

It should be noted that the specified range may be set according to actual needs. For example, the specified range may be set according to an actual height of the marker relative to the depth camera. For example, in an embodiment, the specified range may be [a–b, a+b], where a is a difference value obtained by subtracting a height of a center point of the marker to ground from a height of an optical center of the depth camera to the ground, and b is an error value.

Correspondingly, when the specified range is [a–b, a+b], the height of a suspected charging device area relative to the depth camera may be characterized by a y coordinate of a center point of the suspected charging device area in a depth camera coordinate system.

At this time, the specific implementation process of this step may include the following steps:

(1) Depth information of each pixel in the one or more suspected charging device areas is obtained according to the depth image.

Specifically, with the depth image, the depth information of each pixel in the one or more suspected charging device areas may be obtained. For example, for a pixel $(u_1, v_1)$ in a suspected charging device area, where $(u_1, v_1)$ is the coordinate information of the pixel, at this time, with the coordinate information, the depth information of the pixel may be retrieved from the depth image.

It should be noted that, for the convenience of description, the ith suspected charging device area is designated as Si, and Si=[(ui1,vi1), . . . , (uiN,viN)], where N is equal to the number of pixels included in the ith suspected charging device area. Through this step, the depth information of each pixel in the ith suspected charging device area may be obtained according to the depth image. The coordinate information of the jth pixel in the ith suspected charging device area is (uij, vij), and the depth information is dij, where j=1–N.

(2) Position information of each pixel in the depth camera coordinate system is determined according to the depth information and coordinate information of each pixel in the one or more suspected charging device areas.

In this step, based on a camera projection model, the position information of each pixel in the depth camera coordinate system may be determined according to the depth information and the coordinate information of each pixel in the one or more suspected charging device areas.

The camera projection model may be expressed by a first formula, which is:

$$d_{ij}\begin{bmatrix}u_{ij}\\v_{ij}\\1\end{bmatrix} = \begin{bmatrix}f_x & s & c_x\\0 & f_y & c_y\\0 & 0 & 1\end{bmatrix} \times \begin{bmatrix}x_{ij}\\y_{ij}\\z_{ij}\end{bmatrix},$$

where $d_{ij}$ is the depth information of the $j^{th}$ pixel in the $i^{th}$ suspected charging device area;

$(u_{ij}, v_{ij})$ is the coordinate information of the $j^{th}$ pixel in the $i^{th}$ suspected charging device area;

$(x_{ij}, y_{ij}, z_{ij})$ is the position information of the $j^{th}$ pixel in the $i^{th}$ suspected charging device area in the depth camera coordinate system;

$f_x$ and $f_y$ are equivalent focal lengths of a u axis and a v axis, respectively, $c_x$ and $c_y$ are optical centers of the depth camera, respectively, and s is a non-vertical factor of the u axis and the v axis. In some embodiments, s=0. $f_x$, $f_y$, $c_x$, $c_y$ and s are intrinsic parameters of the depth camera, and all of them may be obtained through a camera marker.

(3) A height of each of the one or more suspected charging device areas relative to the depth camera is calculated according to the position information of respective pixels in the one or more suspected charging device areas in the depth camera coordinate system.

Specifically, a height of a suspected charging device area relative to the depth camera may be characterized by the y coordinate of a center point of the suspected charging device area in the depth camera coordinate system.

For the convenience of description, the height of the $i^{th}$ suspected charging device area relative to the depth camera is designated as Yi. At this time, Yi is calculated by the following formula:

$$Y_i = (1/N)\sum_{j=1}^{N} y_{ij}.$$

(4) It is determined whether there is the target charging device area whose height relative to the depth camera is within the specified range in the one or more suspected charging device areas.

Specifically, in this step, based on the height of each suspected charging device area relative to the depth camera calculated in the step (3), it is determined whether there is the target charging device area whose height relative to the depth camera is within the specified range in the suspected charging device area.

It should be noted that when the height of a suspected charging device area relative to the depth camera falls within the specified range, it indicates that the suspected charging device area is an area that satisfies geometric information of the charging device.

At S104, in response to determining there is the target charging device area, the charging device is identified according to the target charging device area.

Specifically, referring to the previous description, the target charging device area is an area that satisfies the first specified conditions, and the target charging device area satisfies the geometric information of the charging device. Therefore, in an embodiment, the target charging device area may be determined as an area where the charging device is located.

It should be noted that when it is determined that there is no target charging device area whose height relative to the depth camera is within the specified range in the one or more suspected charging device areas, it indicates that the suspected charging device areas do not satisfy the geometric information of the charging device, and are not the area where the charging device is located. At this time, an infrared image and a depth image may be re-captured to identify a charging device.

In the method provided in this embodiment, a marker with a reflectivity greater than a first specified value is provided on a charging device. When identifying a charging device, an infrared image and a depth image of a current field of view are captured, and whether there are one or more suspected charging device areas that satisfy first specified conditions is determined according to the infrared image, then whether there is a target charging device area whose height relative to the depth camera is within a specified range in the suspected charging device areas is determined according to the depth image. Thereby, the charging device is identified according to the target charging device area. The suspected charging device areas are verified based on geometric information of the charging device, and the charging device is identified based on a verified target charging device area, which may effectively improve the accuracy of identification.

Figure 3:
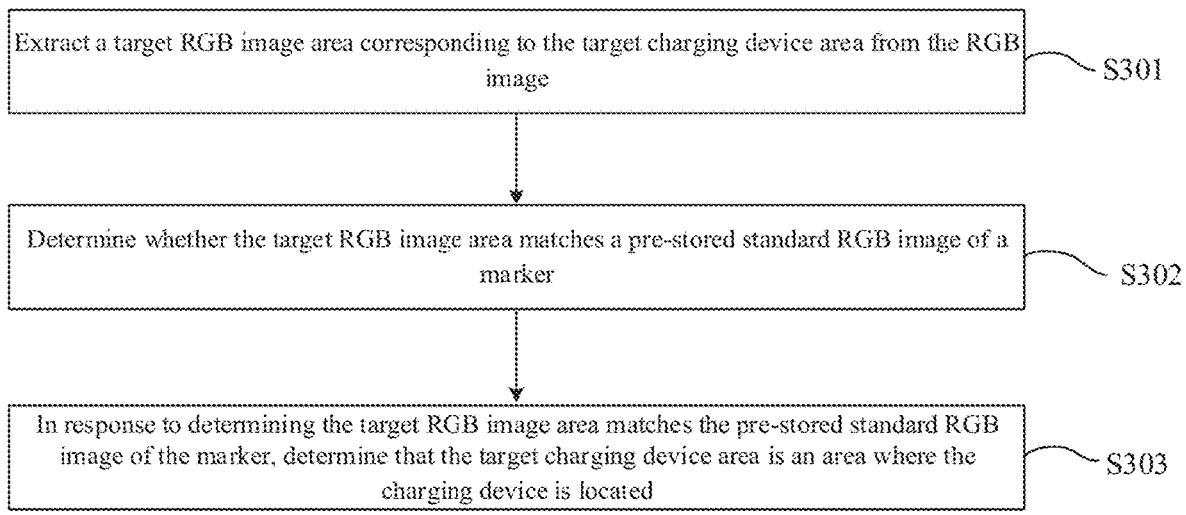
FIG. 3 is a flowchart illustrating a method of identifying a charging device according to a second exemplary embodiment of the present application.

FIG. 3 is a flowchart illustrating a method of identifying a charging device according to a second exemplary embodiment of the present application. On the basis of the above-described embodiment, the method provided in this embodiment may further include: when capturing the infrared image and the depth image of the current field of view with the depth camera, or when it is determined that there is the target charging device area in the one or more suspected charging device areas, capturing a red, green and blue (RGB) image of the current field of view with a RGB camera.

Further, in the method provided in this embodiment, step S104 may include:

At S301, a target RGB image area corresponding to the target charging device area is extracted from the RGB image.

Specifically, referring to FIG. 2, the mobile robot may also be provided with a RGB camera 930. The RGB camera 930 may be provided on the chassis 10 of the mobile robot 1. In the method provided in this embodiment, on the basis of the above-described embodiment, when capturing the infrared image and the depth image of the current field of view with the depth camera, or when it is determined that there is the target charging device area in the suspected charging device areas, the RGB image of the current field of view may be captured with the RGB camera.

Further, the specific implementation process of this step may include:

(1) Coordinate information of respective corresponding pixels in the RGB image of each pixel in the target charging device area is determined according to position information of each pixel in the target charging device area in a depth camera coordinate system, a transformation matrix of the depth camera coordinate system relative to a RGB camera coordinate system, and an intrinsic parameter matrix of the RGB camera.

Specifically, each pixel in the target charging device area may be projected into a RGB projection model to obtain respective corresponding pixels in the RGB image of the pixels.

Figure 4:
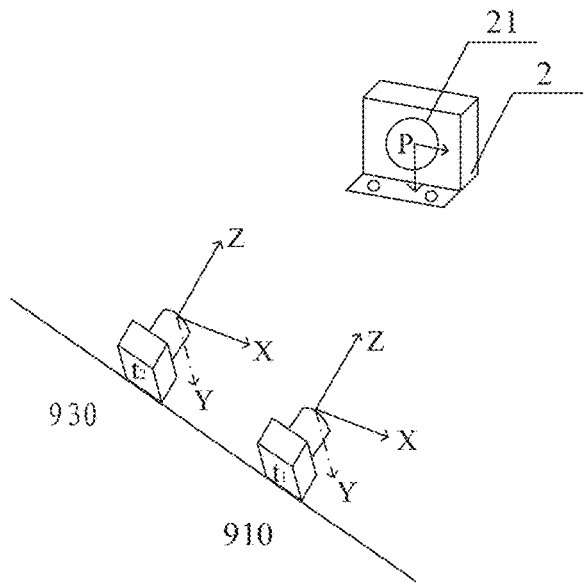
FIG. 4 is a schematic diagram illustrating an installation relationship between a depth camera and a RGB camera on a mobile robot according to an exemplary embodiment of the present application.

FIG. 4 is a schematic diagram illustrating an installation relationship between a depth camera and a RGB camera on a mobile robot according to an exemplary embodiment of the present application. Reference may be made to FIG. 4.

A transformation matrix of the depth camera 910 coordinate system relative to the RGB camera 930 coordinate system is $T_{t2t1}$, and the transformation matrix has an order of 4×4. Further, an intrinsic parameter matrix of the RGB camera 930 is $K_{RGB}$. The intrinsic parameter matrix has an order of 3×3. The target charging device area is the $i^{th}$ suspected charging device area. At this time, the coordinate information of a corresponding pixel to each pixel in the target charging device area in the RGB image may be calculated based on the following formulae:

$$K_{ij} = K_{RGB}^*(T_{t2t1}^* P_{ij}); \text{ and } P_{ij} = \begin{bmatrix} x_{ij} \\ y_{ij} \\ z_{ij} \\ 1 \end{bmatrix},$$

where ($x_{ij}$, $y_{ij}$, $z_{ij}$) is the position information of the $j^{th}$ pixel in the target charging device area in the depth camera coordinate system.

In addition, for the convenience of description, it is assumed that $T_{t2t1}^* P_{ij} = A$. At this time, matrix A has an order of 4×1. After the matrix A is obtained by calculation, the last row vector is deleted from the matrix A to obtain matrix B, which has an order of 3×1. Finally, $K_{RGB}$ is multiplied by the matrix B to obtain $K_{ij}$, which is a matrix of 3×1 order. Further, for the convenience of description, $K_{ij}$ is expressed as follows:

$$K_{ij} = \begin{bmatrix} a_{ij} \\ b_{ij} \\ c_{ij} \end{bmatrix}.$$

At this time, according to the $K_{ij}$, the coordinate information of a corresponding pixel to the $j^{th}$ pixel in the target charging device area in the RGB image may be obtained. For example, the coordinate information of the corresponding pixel is designated as ($u_j$, $v_j$), where $u_j = a_{ij}/c_{ij}$, and $v_{ij} = b_{ij}/c_{ij}$. With the above method, the coordinate information of respective corresponding pixels to each pixel in the target charging device area in the RGB image may be obtained.

(2) The target RGB image area is determined according to the coordinate information of the respective corresponding pixels to each pixel in the target charging device area in the RGB image.

Specifically, corresponding pixels to all pixels in the target charging device area in the RGB image constitute the target RGB image area. In this way, matting processing may be performed on the RGB image to obtain the target RGB image area. That is, the target RGB image area is considered as a suspected area where a charging device is located in the RGB image.

At S302, it is determined whether the target RGB image area matches a pre-stored standard RGB image of the marker 21.

Figure 5:
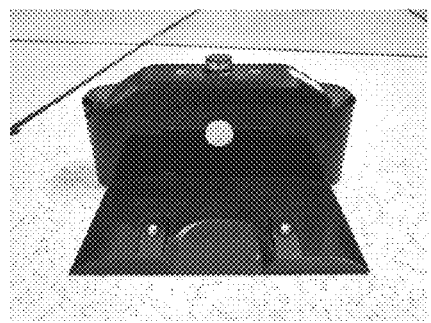
FIG. 5 is a schematic diagram illustrating a charging device according to an exemplary embodiment of the present application.

Specifically, FIG. 5 is a schematic diagram illustrating a charging device according to an exemplary embodiment of the present application. Referring to FIG. 5, the charging device is provided with a marker. For example, as shown in FIG. 5, a marker is provided on a side of the charging device with a charging socket. A standard RGB image of the marker is pre-stored in the mobile robot. In this step, when a similarity between the target RGB image area and the standard RGB image of the marker is greater than a preset threshold, it is determined that the target RGB image area matches the pre-stored standard RGB image of the marker.

Of course, in a possible implementation of the present application, at least two markers with different shapes may be provided on the charging device. The at least two markers are provided on different sides of the charging device, and distances of center points of the at least two markers from a bottom of the charging device are equal. For example, a marker may be provided on both a front side (a side with a charging socket) and a back side (a side opposite to the front side) of the charging device. For example, a circular marker is provided on the front side, and a square marker is provided on the back side. At this time, standard RGB images of the two markers are pre-stored in the mobile robot. In this step, when a similarity between the target RGB image area and the standard RGB image of any of the markers is greater than the preset threshold, it is determined that the target RGB image area matches the pre-stored standard RGB image of the marker.

It should be noted that when at least two markers are provided on a charging device, if a similarity between a target RGB image area and a standard RGB image of any marker is greater than a preset threshold, a target marker to whom a similarity is greater than the preset threshold may be determined based on the similarity between the target RGB image area and the standard RGB image of any marker. In this way, a mobile robot, when moving to the target marker, may be controlled to move to a charging socket according to a positional relationship between the target marker and the charging socket, so that the mobile robot may be docked with the charging device to realize autonomous charging.

It should be noted that a similarity between a target RGB image area and a standard RGB image may be calculated using related similarity calculation methods. For example, in a possible implementation, comparison may be performed according to an NCC (Normalized Cross Correlation) algorithm, and the similarity between the target RGB image area and the standard RGB image is calculated by the following formula:

$$S(A, B) = \frac{\sum_{i,j} A(i, j) B(i, j)}{\sqrt{\sum_{i,j} A(i, j)^2 B(i, j)^2}}$$

where $A(i, j)$ is a gray-scale value of the $(i, j)$ pixel in a target RGB image area A;
$B(i, j)$ is a gray-scale value of the $(i, j)$ pixel in a standard RGB image B;
$S(A, B)$ is a similarity between the target RGB image area A and the standard RGB image B. If $S(A, B)=0$, it indicates that the target RGB image area A is not similar to the standard RGB image B. If $S(A, B)$ is close to 1, it indicates that the target RGB image area A is similar to the standard RGB image B. In some embodiments, when $S(A, B)$ is greater than a specified value, for example, when $S(A, B)>0.7$, they may be determined to be similar. The specified value may be set according to needs.

At S303, in response to determining the target RGB image area matches the pre-stored standard RGB image of the marker, it is determined that the target charging device area is an area where the charging device is located.

Specifically, when it is determined through step S302 that the target RGB image area matches the pre-stored standard RGB image of the marker, in this step, it may be determined that the target charging device area is an area where the charging device is located.

It should be noted that when the target RGB image area does not match the standard RGB image, it is considered that the target RGB image area is not an area where a charging device is located. That is, it may be considered that there is no charging device in the current field of view. At this time, an infrared image and a depth image may be re-captured until the charging device is identified.

In the method provided in this embodiment, when it is determined that there is a target charging device area in one or more suspected charging device areas, the target charging device area is not directly determined as an area where a charging device is located. Instead, a target RGB image area corresponding to the target charging device area is extracted from a captured RGB image, and it is determined whether the target RGB image area matches a pre-stored standard RGB image of a marker. When it is determined that the target RGB image area matches the standard RGB image, the target charging device area is considered as an area where the charging device is located. In this way, the accuracy of identification may be improved.

Figure 6:
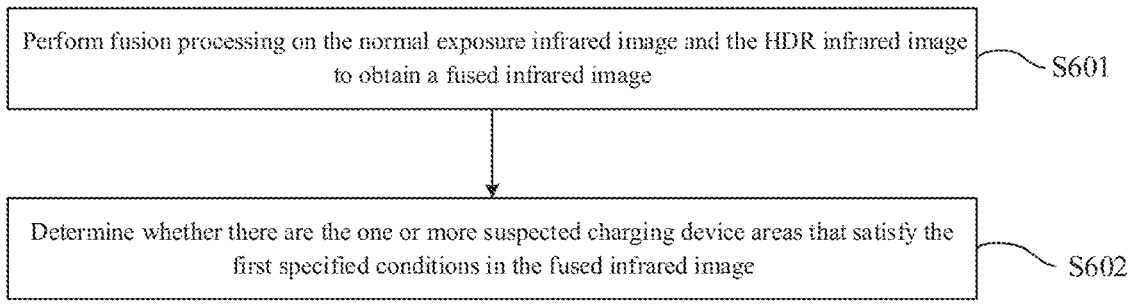
FIG. 6 is a flowchart illustrating a method of identifying a charging device according to a third exemplary embodiment of the present application.

FIG. 6 is a flowchart illustrating a method of identifying a charging device according to a third exemplary embodiment of the present application. On the basis of the above-described embodiments, in the method provided in this embodiment, the infrared image may include a normal exposure infrared image and a high dynamic range (HDR) infrared image. The HDR infrared image is captured when it is determined that a number of pixels with a gray-scale value greater than the second specified value in the normal exposure infrared image is greater than a fourth specified value. At this time, step S102 may include:

At S601, fusion processing is performed on the normal exposure infrared image and the HDR infrared image to obtain a fused infrared image.

Specifically, the fourth specified value may be set according to actual needs. In this embodiment, the fourth specified value is not limited particularly. For example, in an embodiment, the fourth specified value may be equal to 100.

Specifically, in the method provided in this embodiment, a normal exposure infrared image and a depth image are captured firstly with the depth camera. Then, an HDR infrared image is captured when a number of pixels with a gray-scale value greater than a second specified value in the normal exposure infrared image is greater than a fourth specified value. It should be noted that when there is no pixel with a gray-scale value greater than the second specified value in the normal exposure infrared image, or the number of pixels with a gray-scale value greater than the second specified value in the normal exposure infrared image is not greater than the fourth specified value, it is considered that there is no charging device in a current field of view, and an infrared image and a depth image may be re-captured until a charging device is identified.

Specifically, for the specific implementation principle and process of the fusion processing, reference may be made to the description in the related art, which will not be repeated here.

For example, in an embodiment, weight convolution may be performed on gray-scale values at corresponding positions in the normal exposure infrared image and the HDR infrared image to obtain the fused infrared image. The weight convolution may be expressed by the following formula:

$$R(i,j)=a*Z(i,j)*b*H(i,j),$$

where $R(i, j)$ is a gray-scale value of the (i, j) pixel in the fused infrared image;

$Z(i, j)$ is a gray-scale value of the (i, j) pixel in the normal exposure infrared image;

$H(i, j)$ is a gray-scale value of the (i, j) pixel in the HDR infrared image;

a is a weight coefficient of the (i, j) pixel in the normal exposure infrared image; and b is a weight coefficient of the (i, j) pixel in the HDR infrared image.

It should be noted that a weight coefficient of a pixel may be determined in the following way: when a gray-scale value of the pixel is greater than a preset value, which may be any value between 150 and 200, for example, the weight coefficient of the pixel is determined as a specified value, which is 1, for example; when the gray-scale value of the pixel is not greater than the preset value, the weight coefficient of the pixel is determined as another specified value, which is 0.7, for example.

At S602, it is determined whether there are the one or more suspected charging device areas that satisfy the first specified conditions in the fused infrared image.

Specifically, contour detection may be performed on a fused infrared image to determine whether there are one or more suspected charging device areas that satisfy first specified conditions in the fused infrared image.

Figure 7A:
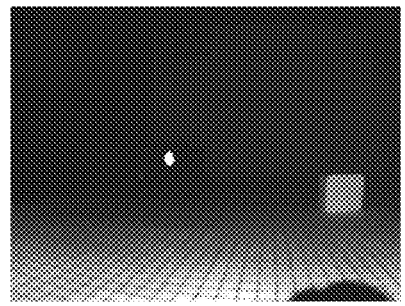
FIG. 7A is a schematic diagram illustrating a normal exposure infrared image according to an exemplary embodiment of the present application.
Figure 7B:
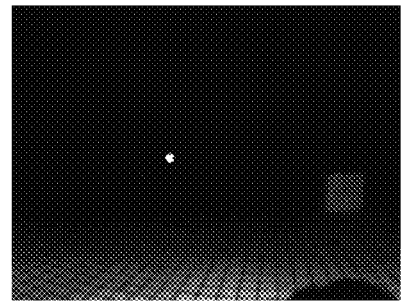
FIG. 7B is a schematic diagram illustrating an HDR infrared image according to an exemplary embodiment of the present application.
Figure 7C:
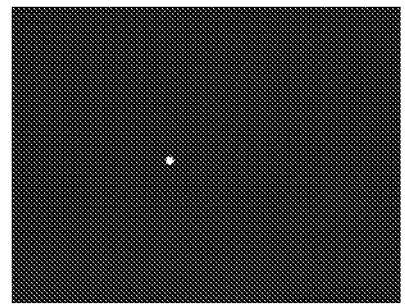
FIG. 7C is a schematic diagram illustrating a fused infrared image obtained using a normal exposure infrared image and an HDR infrared image according to an exemplary embodiment of the present application.

FIG. 7A is a schematic diagram illustrating a normal exposure infrared image according to an exemplary embodiment of the present application. FIG. 7B is a schematic diagram illustrating an HDR infrared image according to an exemplary embodiment of the present application. FIG. 7C is a schematic diagram illustrating a fused infrared image obtained using a normal exposure infrared image and an HDR infrared image according to an exemplary embodiment of the present application.

Referring to FIGS. 7A-7C, when the charging device shown in FIG. 5 appears in the field of view of a mobile robot, since a circular marker is provided on a front side of the charging device, at this time, referring to FIG. 7A, there are one or more suspected charging device areas, i.e., the highly bright areas in FIG. 7A, in the normal exposure infrared image. In order to prevent interference caused by other highly reflective material in an environment, an HDR infrared image is further captured. The captured HDR infrared image is shown in FIG. 7B.

It should be noted that compared with a normal exposure infrared image, an HDR infrared image is captured with a shorter exposure time to obtain an infrared image of a current field of view. In this way, when a charging device appears in the field of view of the mobile robot, since the charging device has a marker with a higher reflectivity thereon, an area still exists in the HDR infrared image. As for other low-reflectivity objects, even if they appear as highly bright areas in the normal exposure infrared image, gray-scale values of the areas where the objects are located are greatly reduced in the HDR infrared image.

Further, a fused infrared image is obtained by performing fusion processing on the normal exposure infrared image and the HDR infrared image. As can be seen from FIG. 7C, when there is a charging device in the field of view of the mobile robot, in the fused infrared image, an area where the charging device is located shows particularly obvious peak data. Therefore, in the method provided in this embodiment, the fused infrared image is used to determine whether there are one or more suspected charging device areas. In this way, the one or more suspected charging device areas may be found quickly and accurately, and non-charging device areas may be excluded in the first place to reduce subsequent calculation amount.

Figure 8:
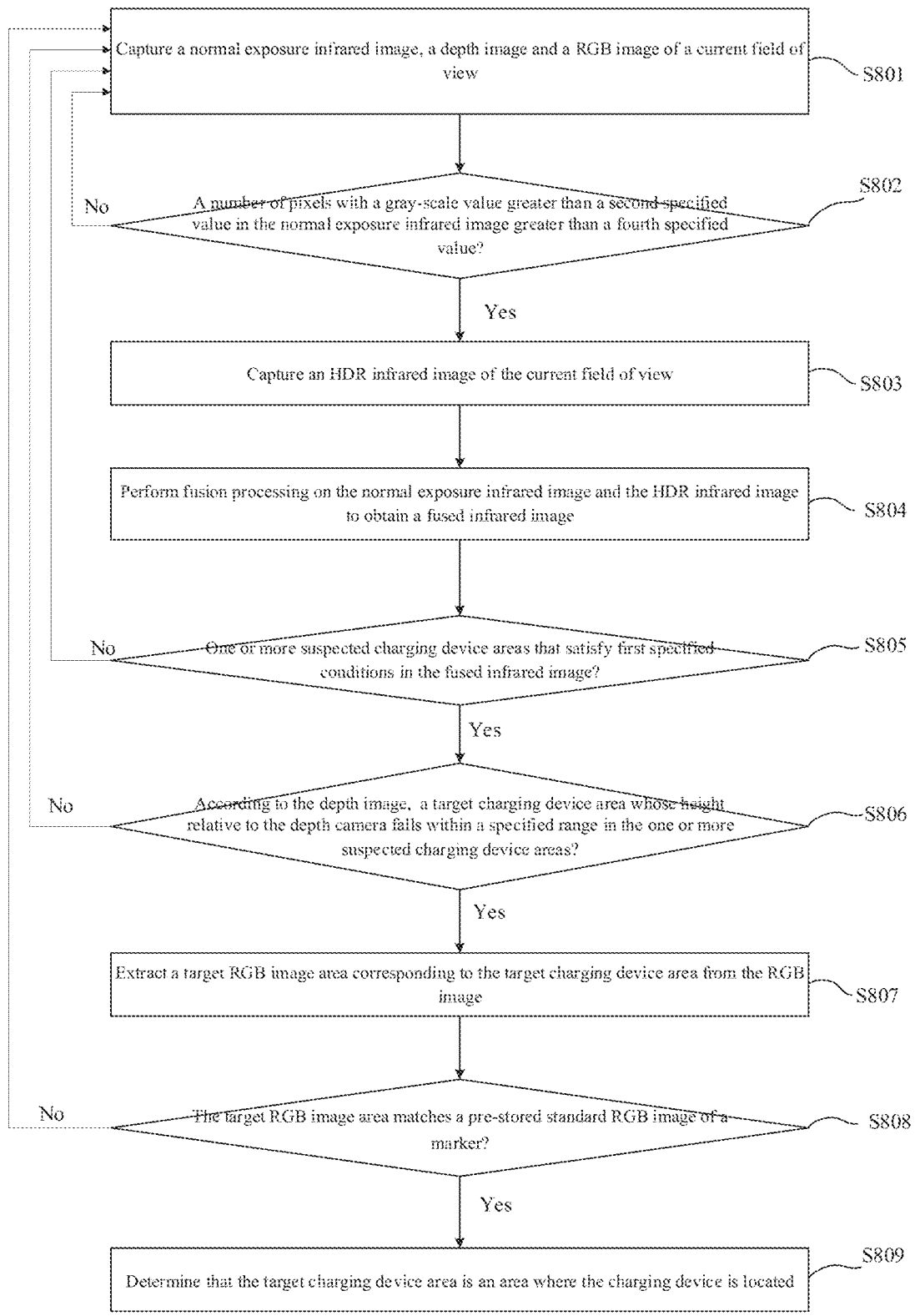
FIG. 8 is a flowchart illustrating a method of identifying a charging device according to a fourth exemplary embodiment of the present application.

FIG. 8 is a flowchart illustrating a method of identifying a charging device according to a fourth exemplary embodiment of the present application. Referring to FIG. 8, the method provided in this embodiment may include:

At S801, a normal exposure infrared image, a depth image and a RGB image of a current field of view are captured.

At S802, it is determined whether a number of pixels with a gray-scale value greater than a second specified value in the normal exposure infrared image is greater than a fourth specified value. If the number of pixels with a gray-scale value greater than the second specified value in the normal exposure infrared image is greater than the fourth specified value, step S803 is performed. If the number of pixels with a gray-scale value greater than the second specified value in the normal exposure infrared image is not greater than the fourth specified value, step S801 is performed.

At S803, an HDR infrared image of the current field of view is captured.

At S804, fusion processing is performed on the normal exposure infrared image and the HDR infrared image to obtain a fused infrared image.

At S805, it is determined whether there are one or more suspected charging device areas that satisfy first specified conditions in the fused infrared image. If there are one or more suspected charging device areas that satisfy the first specified conditions in the fused infrared image, step S806 is performed. If there is no suspected charging device area that satisfies the first specified conditions in the fused infrared image, step S801 is performed.

At S806, it is determined according to the depth image whether there is a target charging device area whose height relative to the depth camera is within a specified range in the one or more suspected charging device areas. If there is the target charging device area in the one or more suspected charging device areas, step S807 is performed. If there is no target charging device area in the suspected charging device areas, step S801 is performed.

At S807, a target RGB image area corresponding to the target charging device area is extracted from the RGB image;

At S808, it is determined whether the target RGB image area matches a pre-stored standard RGB image of a marker. If the target RGB image area matches the pre-stored standard RGB image of the marker, step S809 is performed. If the target RGB image area does not match the pre-stored standard RGB image of the marker, step S801 is performed.

At S809, it is determined that the target charging device area is an area where the charging device is located.

Specifically, for the specific implementation principle and process of each step, reference may be made to the description in the previous embodiments, which will not be repeated here.

In the method provided in this embodiment, after it is determined that there are one or more suspected charging device areas, it is determined whether there is a target charging device area in the one or more suspected charging device areas. Then, when it is determined that there is the target charging device area, it is determined whether a target RGB image area corresponding to the target charging device area in a RGB image matches a standard RGB image. Further, when it is determined that the target RGB image area matches the standard RGB image, it is determined that the target charging device area is an area where a charging device is located. In this way, after two verifications, a finally determined area is the area where the charging device is located. Therefore, the accuracy of identification is greatly improved.

It should be noted that in the method provided in this embodiment, when an area where a charging device is located is determined, a mobile robot may be controlled to move to the charging device according to position information of each pixel in the area in a depth camera coordinate system to realize autonomous charging of the mobile robot. Further, in the method provided in this embodiment, the accuracy of identifying the charging device is relatively high, so that the mobile robot may be controlled to move to the charging device more quickly, and the recharging efficiency of the mobile robot may be effectively improved.

The methods of identifying a charging device provided in this application have been described above. Below, a mobile robot and a system for identifying a charging device provided in this application will be described.

Figure 9:
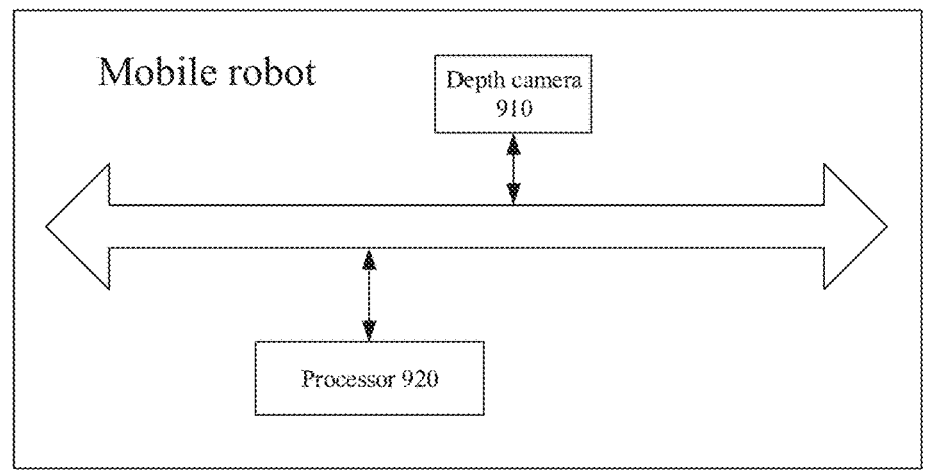
FIG. 9 is a schematic structural diagram illustrating a mobile robot according to a first exemplary embodiment of the present application.

FIG. 9 is a schematic structural diagram illustrating a mobile robot according to a first exemplary embodiment of the present application. Referring to FIG. 9, the mobile robot provided in this embodiment may include a depth camera 910 and a processor 920. The depth camera 910 is configured to capture an infrared image and a depth image of a current field of view. The processor 920 is configured specifically to determine, according to the infrared image, whether there are one or more suspected charging device areas that satisfy first specified conditions, where the first specified conditions indicate that a gray-scale value of each pixel in an area is greater than a second specified value, and a number of pixels in the area is greater than a third specified value; if there are the one or more suspected charging device areas, determine, according to the depth image, whether there is a target charging device area whose height relative to the depth camera is within a specified range in the one or more suspected charging device areas; if there is the target charging device area in the one or more suspected charging device areas, identify a charging device according to the target charging device area.

Specifically, the mobile robot provided in this embodiment may be used to implement the technical solution of the method embodiment shown in FIG. 1. Their implementation principles and technical effects are similar, and will not be repeated here.

Figure 10:
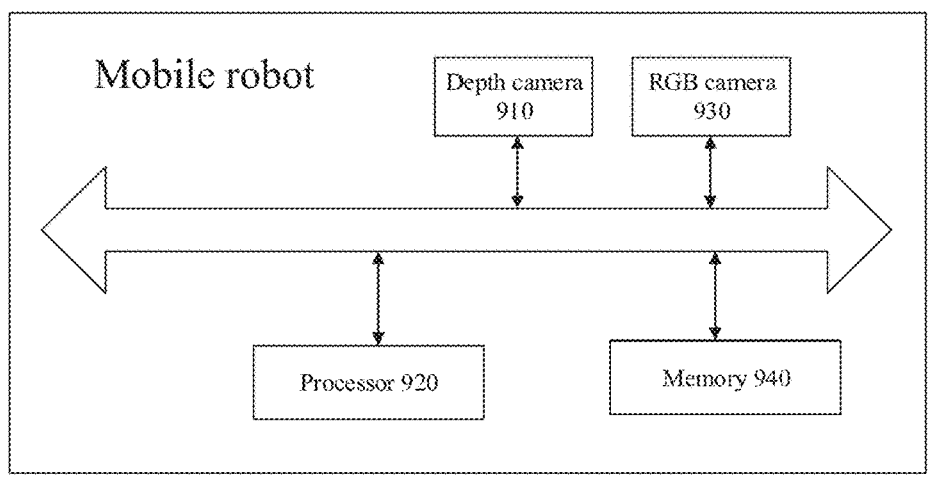
FIG. 10 is a schematic structural diagram illustrating a mobile robot according to a second exemplary embodiment of the present application.

FIG. 10 is a schematic structural diagram illustrating a mobile robot according to a second exemplary embodiment of the present application. Referring to FIG. 10, on the basis of the above-described embodiment, the mobile robot provided in this embodiment further includes a red, green and blue (RGB) camera 930. The RGB camera 930 is configured to capture a RGB image of the current field of view when the depth camera 910 captures the infrared image and the depth image of the current field of view, or when the processor 920 determines that there is the target charging device area in the one or more suspected charging device areas. The processor 920 is configured to extract a target RGB image area corresponding to the target charging device area from the RGB image, determine whether the target RGB image area matches a pre-stored standard RGB image of a marker, and when it is determined that the target RGB image area matches the pre-stored standard RGB image of the marker, determine that the target charging device area is an area where the charging device is located.

It should be noted that the mobile robot provided in this embodiment may further include a memory 940. The memory 940 is configured to store the infrared image, the depth image and the RGB image.

Further, the infrared image includes a normal exposure infrared image and a high dynamic range (HDR) infrared image, and the HDR infrared image is captured when it is determined that a number of pixels with a gray-scale value greater than the second specified value in the normal exposure infrared image is greater than a fourth specified value.

In this case, the processor 920 is configured specifically to perform fusion processing on the normal exposure infrared image and the HDR infrared image to obtain a fused infrared image, and determine whether there are the one or more suspected charging device areas that satisfy the first specified conditions in the fused infrared image.

Further, the processor 920 is configured specifically to: obtain depth information of each pixel in the one or more suspected charging device areas according to the depth image; determine, according to the depth information and coordinate information of each pixel in the suspected charging device areas, position information of each pixel in a depth camera coordinate system; calculate, according to the position information of each pixel in the suspected charging device areas in the depth camera coordinate system, a height of each of the suspected charging device areas relative to the depth camera; and determine whether there is a target charging device area whose height relative to the depth camera falls within the specified range in the one or more suspected charging device areas.

Further, the processor 920 is configured specifically to: determine coordinate information of a corresponding pixel to each pixel in the target charging device area in the RGB image according to position information of each pixel in the target charging device area in a depth camera coordinate system, a transformation matrix of the depth camera coordinate system relative to a RGB camera coordinate system, and an intrinsic parameter matrix of the RGB camera; and determine the target RGB image area according to the coordinate information of the corresponding pixel to each pixel in the target charging device area in the RGB image.

Further, the charging device is provided with one marker. That the target RGB image area matches the pre-stored standard RGB image of the marker comprises: a similarity between the target RGB image area and a standard RGB image of the marker being greater than a preset threshold.

Alternatively, the charging device is provided with at least two markers with different shapes. The at least two markers are provided on different sides of the charging device. Distances of center points of the at least two markers from a bottom of the charging device are equal. In this case, that the target RGB image area matches the pre-stored standard RGB image of the marker comprises: a similarity between the target RGB image area and a standard RGB image of any of the markers being greater than a preset threshold.

Figure 11:
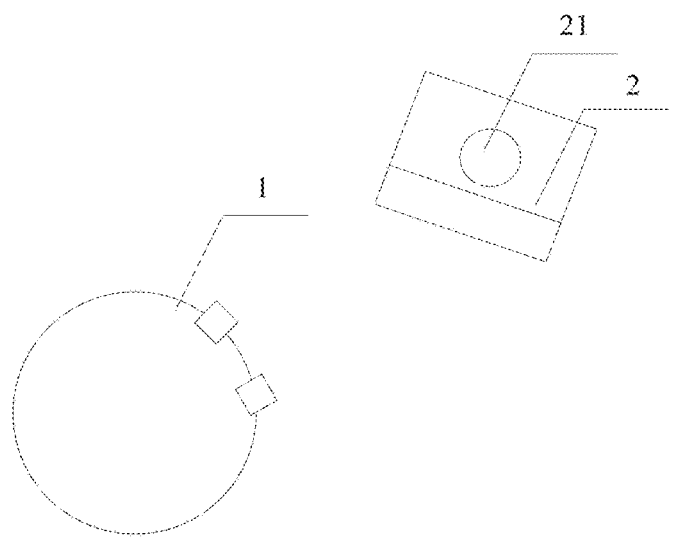
FIG. 11 is a schematic diagram illustrating a system for identifying a charging device according to an exemplary embodiment of the present application.

FIG. 11 is a schematic diagram illustrating a system for identifying a charging device according to an exemplary embodiment of the present application. Referring to FIG. 11, the system for identifying the charging device provided in this embodiment may include any mobile robot 1 provided in this application, and a charging device 2 configured to charge the mobile robot 1, where the charging device 2 is provided with a marker 21, and a reflectivity of the marker 21 is greater than a first specified value.

Specifically, referring to the previous description, at least one marker 21 may be provided on the charging device 2, and the at least one marker 21 may be provided on a specified side. For example, the at least one marker 21 is provided on a side of the charging device 2 with a charging socket. Of course, at least two markers 21 with different shapes may be provided on the charging device 2. The at least two markers 21 are provided on different sides of the charging device 2, and distances of center points of the at least two markers 21 from a bottom of the charging device 2 are equal.

The above are only preferred embodiments of the present application, which are not intended to limit the application. Any modification, equivalent replacement, improvement, etc. made within the spirit and principle of this application shall be included within the protection scope of the application.

The invention claimed is:

1. A method of identifying a charging device, wherein a marker is provided on the charging device, a reflectivity of the marker is greater than a first specified value, and the method is applied to a mobile robot, and comprises:
capturing an infrared image and a depth image of a current field of view with a depth camera;
determining, according to the infrared image, whether there are one or more suspected charging device areas that satisfy first specified conditions, wherein the first specified conditions indicate that a gray-scale value of each of pixels in an area is greater than a second specified value, and a number of the pixels in the area is greater than a third specified value;
in response to determining there are the one or more suspected charging device areas, determining, according to the depth image, whether there is a target charging device area whose height relative to the depth camera falls within a specified range in the one or more suspected charging device areas; and
in response to determining there is the target charging device area in the one or more suspected charging device areas, identifying the charging device according to the target charging device area.

2. The method according to claim 1, wherein the method further comprises:
when capturing the infrared image and the depth image of the current field of view with the depth camera, or when it is determined that there is the target charging device area in the one or more suspected charging device areas, capturing a red, green and blue (RGB) image of the current field of view with a RGB camera; and
wherein identifying the charging device according to the target charging device area comprises:
extracting a target RGB image area corresponding to the target charging device area from the RGB image;
determining whether the target RGB image area matches a pre-stored standard RGB image of the marker; and
in response to determining the target RGB image area matches the pre-stored standard RGB image of the marker, determining that the target charging device area is an area where the charging device is located.

3. The method according to claim 2, wherein extracting the target RGB image area corresponding to the target charging device area from the RGB image comprises:
determining coordinate information of a corresponding pixel to each of pixels in the target charging device area in the RGB image according to position information of each of the pixels in the target charging device area in a depth camera coordinate system, a transformation matrix of the depth camera coordinate system relative to a RGB camera coordinate system, and an intrinsic parameter matrix of the RGB camera; and
determining the target RGB image area according to the coordinate information of the corresponding pixel to each of the pixels in the target charging device area in the RGB image.

4. The method according to claim 2, wherein
the charging device is provided with one marker, and
the target RGB image area matching the pre-stored standard RGB image of the marker comprises: a similarity between the target RGB image area and the standard RGB image of the marker being greater than a preset threshold.

5. The method according to claim 2, wherein
the charging device is provided with at least two markers with different shapes, the at least two markers are provided on different sides of the charging device, and distances of center points of the at least two markers from a bottom of the charging device are equal; and
the target RGB image area matching the pre-stored standard RGB image of the marker comprises: a similarity between the target RGB image area and a standard RGB image of any one of the markers being greater than a preset threshold.

6. The method according to claim 1, wherein
the infrared image comprises a normal exposure infrared image and a high dynamic range (HDR) infrared image, and the HDR infrared image is captured when it is determined that a number of pixels with a gray-scale value greater than the second specified value in the normal exposure infrared image is greater than a fourth specified value; and
determining, according to the infrared image, whether there are the one or more suspected charging device areas that satisfy the first specified conditions comprises:
performing fusion processing on the normal exposure infrared image and the HDR infrared image to obtain a fused infrared image; and
determining whether there are the one or more suspected charging device areas that satisfy the first specified conditions in the fused infrared image.

7. The method according to claim 1, wherein determining, according to the depth image, whether there is the target charging device area whose height relative to the depth camera falls within the specified range in the one or more suspected charging device areas comprises:
obtaining depth information of each of pixels in the one or more suspected charging device areas according to the depth image;
determining, according to the depth information and coordinate information of each of the pixels in the one or more suspected charging device areas, position information of each of the pixels in a depth camera coordinate system;

calculating, according to the position information of each of the pixels in the one or more suspected charging device areas in the depth camera coordinate system, respective heights of the one or more suspected charging device areas relative to the depth camera; and determining whether there is the target charging device area whose height relative to the depth camera falls within the specified range in the one or more suspected charging device areas.

8. A mobile robot, comprising:

a depth camera configured to capture an infrared image and a depth image of a current field of view; and a processor configured to:

determine, according to the infrared image, whether there are one or more suspected charging device areas that satisfy first specified conditions, wherein the first specified conditions indicate that a grayscale value of each of pixels in an area is greater than a second specified value, and a number of the pixels in the area is greater than a third specified value;

in response to determining there are the one or more suspected charging device areas, determine, according to the depth image, whether there is a target charging device area whose height relative to the depth camera falls within a specified range in the one or more suspected charging device areas; and in response to determining there is the target charging device area in the one or more suspected charging device areas, identify a charging device for the mobile robot according to the target charging device area.

9. The mobile robot according to claim 8, further comprising: a red, green and blue (RGB) camera configured to, when the depth camera captures the infrared image and the depth image of the current field of view, or when the processor determines that there is the target charging device area in the one or more suspected charging device areas, capture a RGB image of the current field of view; and wherein the processor is configured to extract a target RGB image area corresponding to the target charging device area from the RGB image, determine whether the target RGB image area matches a pre-stored standard RGB image of a marker, and when it is determined that the target RGB image area matches the pre-stored standard RGB image of the marker, determine that the target charging device area is an area where the charging device is located.

10. The mobile robot according to claim 9, when extracting the target RGB image area corresponding to the target charging device area from the RGB image, the processor is configured to:

determine coordinate information of a corresponding pixel to each of pixels in the target charging device area in the RGB image according to position information of each of the pixels in the target charging device area in a depth camera coordinate system, a transformation matrix of the depth camera coordinate system relative to a RGB camera coordinate system, and an intrinsic parameter matrix of the RGB camera; and determine the target RGB image area according to the coordinate information of the corresponding pixel to each of the pixels in the target charging device area in the RGB image.

11. The mobile robot according to claim 9, wherein the charging device is provided with one marker, and the target RGB image area matching the pre-stored standard RGB image of the marker comprises: a similarity between the target RGB image area and the standard RGB image of the marker being greater than a preset threshold.

12. The mobile robot according to claim 9, wherein the charging device is provided with at least two markers with different shapes, the at least two markers are provided on different sides of the charging device, and distances of center points of the at least two markers from a bottom of the charging device are equal; and the target RGB image area matching the pre-stored standard RGB image of the marker comprises: a similarity between the target RGB image area and a standard RGB image of any one of the markers being greater than a preset threshold.

13. The mobile robot according to claim 8, wherein the infrared image includes a normal exposure infrared image and a high dynamic range (HDR) infrared image, and the HDR infrared image is captured when it is determined that a number of pixels with a grayscale value greater than the second specified value in the normal exposure infrared image is greater than a fourth specified value; and the processor is configured to perform fusion processing on the normal exposure infrared image and the HDR infrared image to obtain a fused infrared image, and determine whether there are the one or more suspected charging device areas that satisfy the first specified conditions in the fused infrared image.

14. The mobile robot according to claim 8, when determining, according to the depth image, whether there is the target charging device area whose height relative to the depth camera falls within the specified range in the one or more suspected charging device areas, the processor is configured to:

obtain depth information of each of pixels in the one or more suspected charging device areas according to the depth image;

determine, according to the depth information and coordinate information of each of the pixels in the one or more suspected charging device areas, position information of each of the pixels in a depth camera coordinate system;

calculate, according to the position information of each of the pixels in the one or more suspected charging device areas in the depth camera coordinate system, respective heights of the one or more suspected charging device areas relative to the depth camera; and determine whether there is the target charging device area whose height relative to the depth camera falls within the specified range in the one or more suspected charging device areas.

15. A system for identifying a charging device, comprising:

a mobile robot; and a charging device configured to charge the mobile robot, wherein a marker is provided on the charging device, and a reflectivity of the marker is greater than a first specified value;

wherein the mobile robot comprises:

a depth camera configured to capture an infrared image and a depth image of a current field of view; and a processor configured to:

determine, according to the infrared image, whether there are one or more suspected charging device areas that satisfy first specified conditions, wherein the first specified conditions indicate that a gray-scale value of each of pixels in an area is greater than a second specified value, and a number of the pixels in the area is greater than a third specified value;

in response to determining there are the one or more suspected charging device areas, determine, according to the depth image, whether there is a target charging device area whose height relative to the depth camera falls within a specified range in the one or more suspected charging device areas; and in response to determining there is the target charging device area in the one or more suspected charging device areas, identify the charging device for the mobile robot according to the target charging device area.

16. The system for identifying a charging device according to claim 15, wherein the mobile robot further comprises: a red, green and blue (RGB) camera configured to, when the depth camera captures the infrared image and the depth image of the current field of view, or when the processor determines that there is the target charging device area in the one or more suspected charging device areas, capture a RGB image of the current field of view; and wherein the processor is configured to extract a target RGB image area corresponding to the target charging device area from the RGB image, determine whether the target RGB image area matches a pre-stored standard RGB image of a marker, and when it is determined that the target RGB image area matches the pre-stored standard RGB image of the marker, determine that the target charging device area is an area where the charging device is located.

17. The system according to claim 16, when extracting the target RGB image area corresponding to the target charging device area from the RGB image, the processor is configured to:

determine coordinate information of a corresponding pixel to each of pixels in the target charging device area in the RGB image according to position information of each of the pixels in the target charging device area in a depth camera coordinate system, a transformation matrix of the depth camera coordinate system relative to a RGB camera coordinate system, and an intrinsic parameter matrix of the RGB camera; and determine the target RGB image area according to the coordinate information of the corresponding pixel to each of the pixels in the target charging device area in the RGB image.

18. The system for identifying a charging device according to claim 16, wherein the charging device is provided with one marker, and the target RGB image area matching the pre-stored standard RGB image of the marker comprises: a similarity between the target RGB image area and the standard RGB image of the marker being greater than a preset threshold; or the charging device is provided with at least two markers with different shapes, the at least two markers are provided on different sides of the charging device, and distances of center points of the at least two markers from a bottom of the charging device are equal; and the target RGB image area matching the pre-stored standard RGB image of the marker comprises: a similarity between the target RGB image area and a standard RGB image of any one of the markers being greater than a preset threshold.

19. The system for identifying a charging device according to claim 15, wherein the infrared image includes a normal exposure infrared image and a high dynamic range (HDR) infrared image, and the HDR infrared image is captured when it is determined that a number of pixels with a gray-scale value greater than the second specified value in the normal exposure infrared image is greater than a fourth specified value; and the processor is configured to perform fusion processing on the normal exposure infrared image and the HDR infrared image to obtain a fused infrared image, and determine whether there are the one or more suspected charging device areas that satisfy the first specified conditions in the fused infrared image.

20. The system for identifying a charging device according to claim 15, when determining, according to the depth image, whether there is the target charging device area whose height relative to the depth camera falls within the specified range in the one or more suspected charging device areas, the processor is configured to:

obtain depth information of each of pixels in the one or more suspected charging device areas according to the depth image;

determine, according to the depth information and coordinate information of each of the pixels in the one or more suspected charging device areas, position information of each of the pixels in a depth camera coordinate system;

calculate, according to the position information of each of the pixels in the one or more suspected charging device areas in the depth camera coordinate system, respective heights of the one or more suspected charging device areas relative to the depth camera; and determine whether there is the target charging device area whose height relative to the depth camera falls within the specified range in the one or more suspected charging device areas.

\* \* \* \* \*